US006435876B1

(12) United States Patent
Chen

(10) Patent No.: US 6,435,876 B1
(45) Date of Patent: Aug. 20, 2002

(54) INTERACTIVE LEARNING OF A FOREIGN LANGUAGE

(75) Inventor: Timothy Xun Chen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/753,416

(22) Filed: Jan. 2, 2001

(51) Int. Cl.[7] ................................. G09B 19/06
(52) U.S. Cl. .................. 434/157; 434/167; 434/178
(58) Field of Search ................. 434/157, 156, 434/167, 169, 178, 185, 247, 252

(56) References Cited

U.S. PATENT DOCUMENTS

| 4,913,539 | A | * | 4/1990 | Lewis ..................... 352/87 |
|---|---|---|---|---|
| 5,149,104 | A | * | 9/1992 | Edelstein .................. 273/434 |
| 5,286,205 | A | * | 2/1994 | Inouye et al. .............. 434/157 |
| 5,503,560 | A | * | 4/1996 | Stentiford ................. 434/167 |
| 5,766,015 | A | * | 6/1998 | Shpiro .................... 434/156 |
| 5,823,786 | A | * | 10/1998 | Easterbrook ............... 434/247 |
| 5,882,202 | A | * | 3/1999 | Sameth et al. ............. 434/157 |
| 5,984,684 | A | * | 11/1999 | Brostedt et al. ........... 434/252 |
| 5,995,932 | A | * | 11/1999 | Houde .................... 704/261 |

* cited by examiner

Primary Examiner—Kien T. Nguyen
(74) Attorney, Agent, or Firm—Fish & Richardson P.C.

(57) ABSTRACT

A language instructional process is disclosed. The process includes identifying a word or sentence having sound that is difficult to pronounce or that is often confused. The process also includes training to hear the sound accurately, viewing mouth movement when making the sound, and pronouncing the word or sentence. The process further includes recording the mouth movement when pronouncing the word or sentence, sending a recording of the mouth movement to an instructor, and reviewing a feedback from the instructor.

19 Claims, 5 Drawing Sheets

INTERACTIVE LEARNING OF A FOREIGN LANGUAGE

BACKGROUND

This invention relates to methods for learning a language, and more particularly to a computer-assisted learning.

Development of instructional and teaching systems has improved significantly with the advent of multimedia technology. In this environment, an efficient learning system should permit a student to learn at the individual's own pace. This provides an instructor with opportunity to spend more time working on student's particular needs, manage larger classes, or work with multiple classrooms. These opportunities increase efficiency and productivity of learning.

The prior art language learning systems often utilize a static lesson format that is typically arranged in a predefined order. This format ignores the individual needs of each student and forces the student to conform to a static method that may not fit the student's specific needs. Further, the conventional systems often lack the interactivity that is desirable in language learning.

DESCRIPTION OF DRAWINGS

These and other features and advantages of the invention will become more apparent upon reading the following detailed description and upon reference to the accompanying drawings.

DETAILED DESCRIPTION

In recognition of the above-described difficulties with conventional language learning systems, the inventor realized the need for an integrated language instructional system. The present disclosure describes the integrated language instructional system directed to effectively learning a foreign language. The integrated instructional system is particularly directed to training to hear accurately and improving pronunciation of selected sounds.

The instructional system is further directed to viewing the mouth movement while listening to the selected sounds.

Figure 1A:
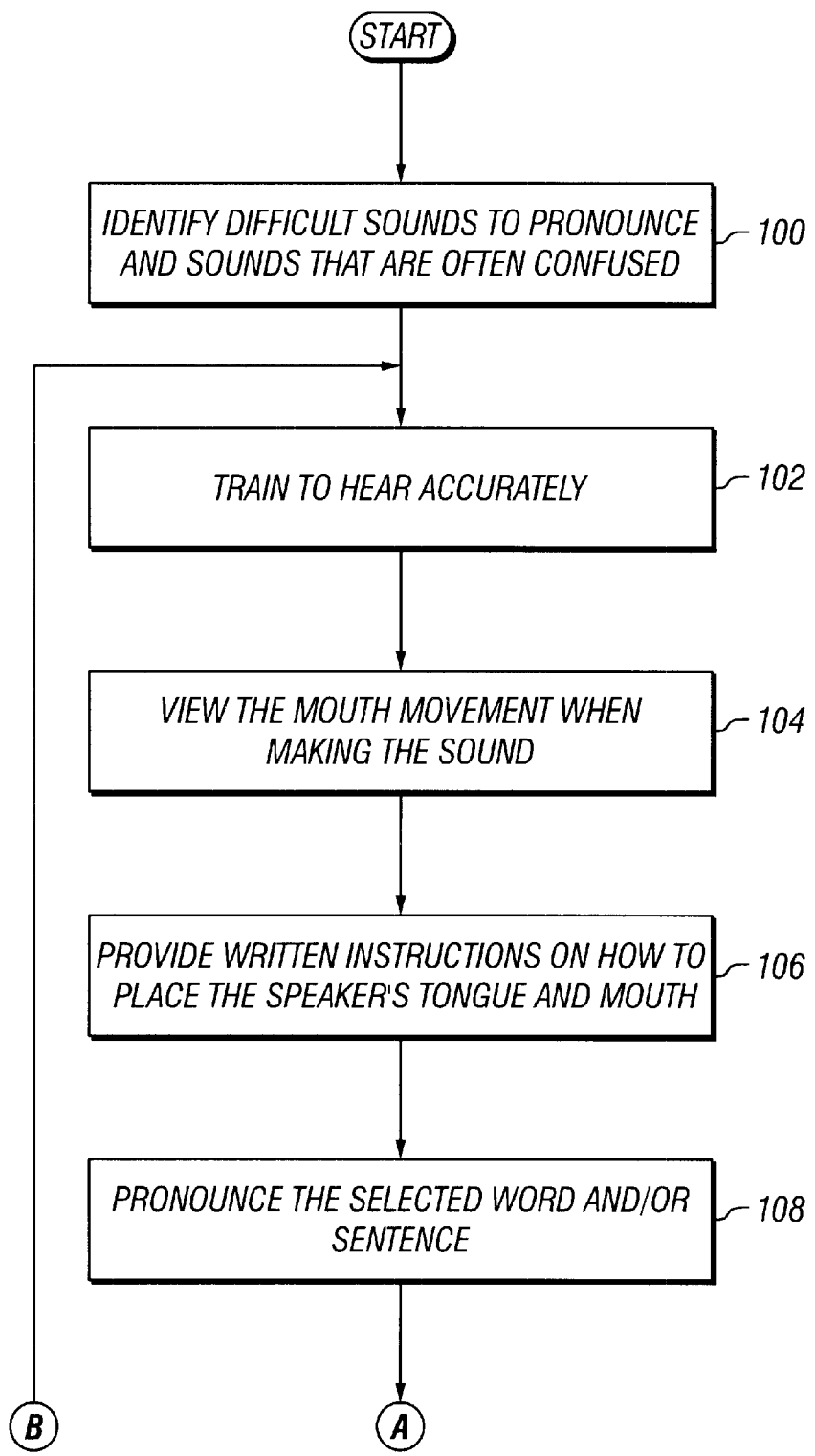
FIGS. 1A and 1B illustrate an interactive process for effectively learning a foreign language according to an embodiment.
Figure 1B:
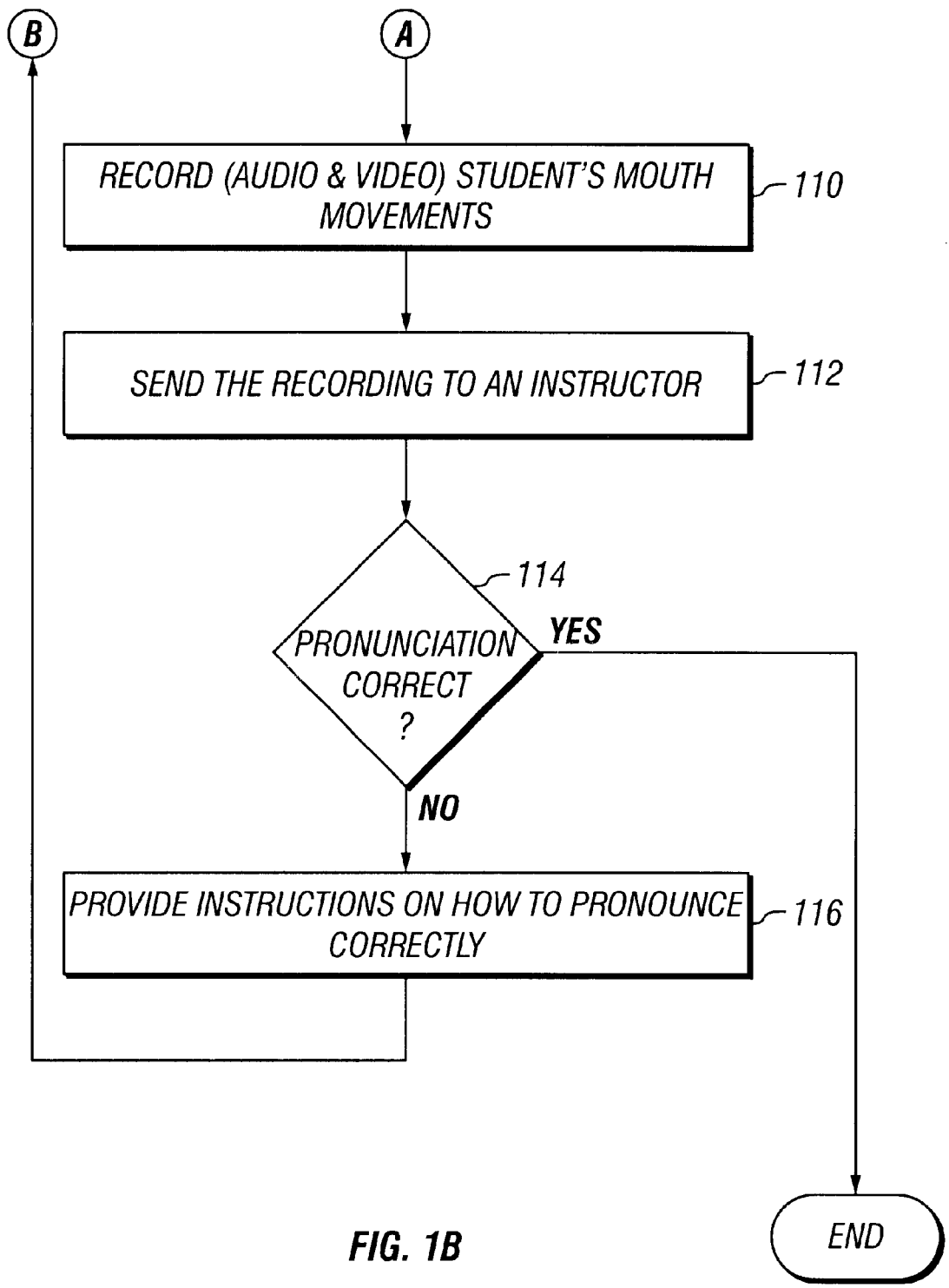

An interactive process for effectively learning a foreign language is illustrated in FIGS. 1A and 1B. The interactive process identifies sounds that are difficult to pronounce or sounds that are often confused, at 100. In American English, for example, certain letter pairs may be classified as either belonging to voiced or voiceless sounds. These may be letter pairs in which the sounds are not readily distinguishable. Examples of letter pairs may include 'p'/'b', 't'/'d', 'f'/'v', 's'/'z', 'l'/'r' and 'k'/'g'. There are many other similar letter pairs. Accordingly, word pairs such as 'loose'and 'lose', or 'low' and 'row' may be easily confused or difficult to distinguish. Therefore, the interactive process reinforces the distinction between the voiced and voiceless sounds. This may be done by actively training to hear accurately, at 102, the sounds that are difficult to pronounce and are easily confused.

Mouth movement of the instructor may be viewed at 104 to ascertain the placement of the tongue, movement of the jaw, and the orientation or shape of the mouth. The movement may be exaggerated to clearly show how the word may be pronounced. The placement of the tongue and the orientation of the mouth may also be described in a written instruction, at 106. For example, in pronouncing a word starting with a letter '1', the written instruction may include following advise. "Touch the tip of your tongue to the upper gum ridge. Open your lips wide enough to allow the tip of your finger between your teeth. Then, produce sound." In instructing the student to pronounce a similar word starting with a letter 'r', the instruction may advise the student "to curl the tongue back further without touching the roof of the mouth."

The hearing and viewing may be done with any streaming media player available for a particular operating system on a computer. Some exemplary streaming media players may include RealNetworks' RealPlayer, and other streaming media players.

In some embodiments, hearing 102, viewing 104, and reading 106 may be done simultaneously to provide a comprehensive means for learning to pronounce the words. At 108, the student pronounces the word. In pronouncing selected words, a distinction may be made between clear and dark words. For example, a clear word may include a word having 'l' sound at the beginning of the word, such as logic, love, and located. Thus, a dark word may include a word having 'l ' sound at the end of the word, such as cell, hotel, gamble, and middle. A dark word may be pronounced with the tip of the tongue being slightly farther back in the mouth than the clear word.

Once the student has become proficient at pronouncing the selected words, the interactive process may advise the student to pronounce some selected sentences involving such selected words. The interactive process may then record the student's mouth and tongue movements at 110. The recording may involve both audio and video recording. The audio portion may be captured with a microphone while the video recording may be done with a video camera. The recording may be stored in a video/audio tape. The recording may also be digitally stored in a computer memory or a compact disk. To capture video and audio data, authoring tools such as RealNetworks' RealPresenter may be used.

The recording is then sent to the instructor at 112. The video/audio tape of the recording may be sent via the mail system. The recording may also be sent electronically through a network, such as e-mail, or the Internet. Once the instructor receives the recording, the instructor may decide whether the student has pronounced the selected word or sentence sufficiently correctly at 114. If the instructor determines that the student did not pronounce the word or sentence sufficiently correctly, the instructor may provide instructions on how to pronounce the word or sentence correctly at 116. This instruction may be provide orally or in writing. The instruction may also include some visual aids to further guide the student. The student may then be instructed to review the training to hear accurately and to review the video again.

Figure 2:
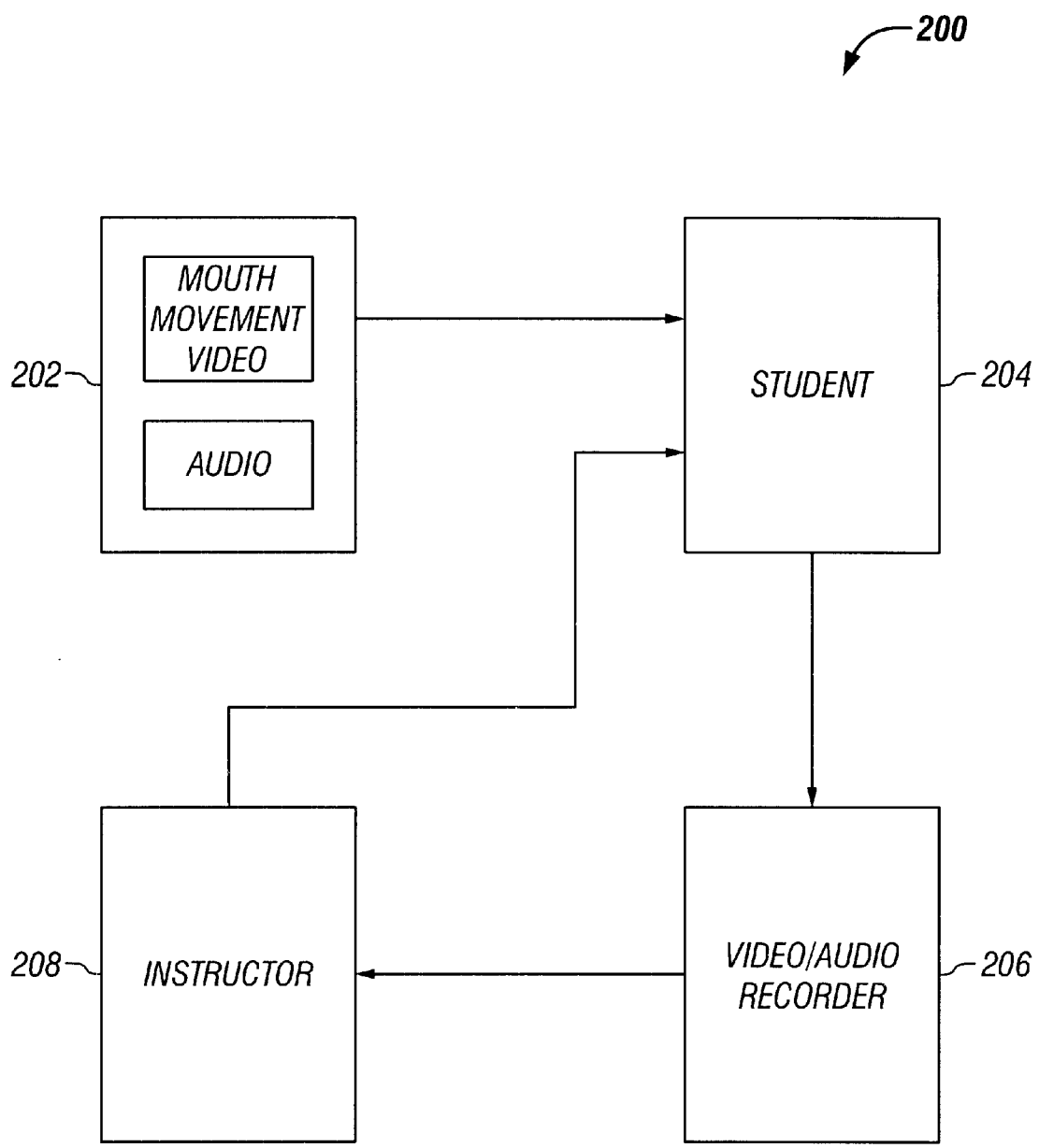
FIG. 2 is a block diagram of an integrated language instructional system in accordance with an embodiment of the present disclosure.

FIG. 2 is a block diagram of an integrated language instructional system 200 in accordance with an embodiment of the present disclosure. The system 200 includes a multimedia player 202 and a video/audio recorder 206. The multimedia player 202 provides video and audio instructions on how to shape mouth, tongue, and jaw, to correctly pronounce selected words or sentences. The multimedia player 202 includes a video portion 212 and an audio portion 210. The multimedia player 202 may reside within a computer to be operated by an operating system.

The student 204 listens to the audio portion of the instruction to train to hear the selected sounds accurately. The student 204 also views the video portion 212 of the instruction to study the mouth, tongue, and jaw movements. The student 204 then pronounces the selected words or sentences. This is recorded with a video/audio recorder 206. The video/audio recorder 206 may interface with a computer to digitally record the movements.

The recording is then sent to the instructor 208 for evaluation. The instructor 208 may provide further instructions to help the student 204 pronounce the selected words or sentences correctly.

Figure 3:
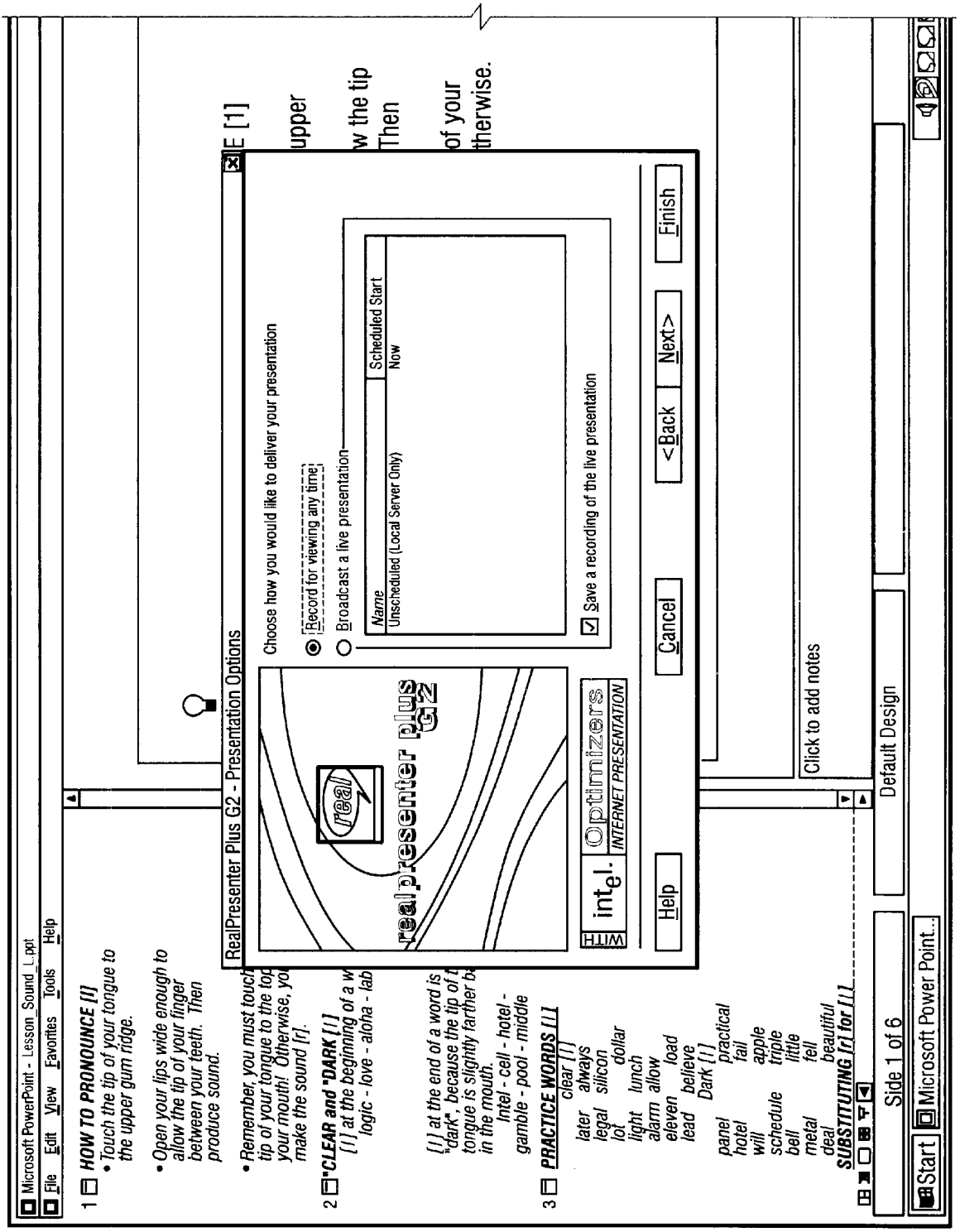
FIGS. 3 and 4 show sample screens of the integrated language instructional system 200.
Figure 4:
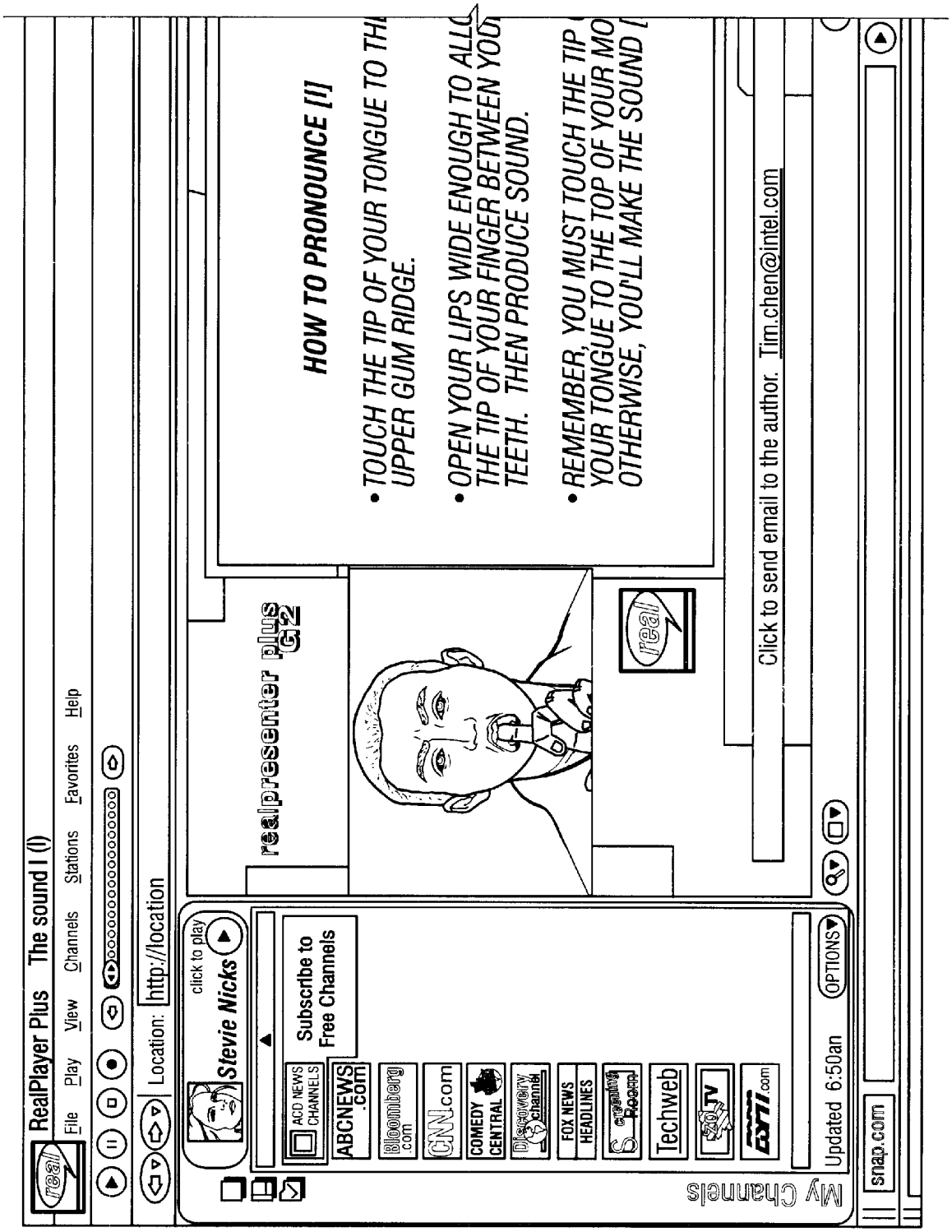

FIGS. 3 and 4 show sample screens of the integrated language instructional system 200.

While specific embodiments of the invention have been illustrated and described, other embodiments and variations are possible. For example, although the illustrated embodiment shows only a limited number of examples for identifying sounds that are difficult to pronounce or sounds that are often confused, other examples are envisioned to provide some criteria for determining or identifying the sounds. These other examples may include comparing stresses that are in different syllables of the selected words. For example, related nouns and verbs may be spelled the same but may be used differently in a sentence by putting stresses in different syllables. Examples of these may include words such as record, permit, survey, object, present, and conflict, where the stress shifts depending upon whether the word is used as a verb or a noun.

All these are intended to be encompassed by the following claims.

What is claimed is:

1. An instructional method, comprising:

identifying a word or sentence having sound that is difficult to pronounce or that is often confused;

training to hear the sound accurately;

viewing mouth movement when making the sound;

pronouncing the word or sentence;

recording the mouth movement when pronouncing the word or sentence;

sending a recording of the mouth movement to an instructor; and reviewing a feedback from the instructor.

2. The method of claim 1, further comprising:

simultaneously providing written instructions on how to move tongue and mouth during said viewing mouth movement.

3. The method of claim 2, further comprising:

reading said written instructions.

4. The method of claim 3, wherein said training to hear, said viewing mouth movement, and said reading the written instruction are performed substantially simultaneously.

5. The method of claim 1, wherein said receiving said feedback includes:

determining whether said pronouncing is done correctly; and providing instructions on how to pronounce the word or sentence correctly when said pronouncing is not done sufficiently correctly.

6. The method of claim 1, wherein said identifying said word or sentence includes selecting word pairs with letter pairs that belong to voiced or voiceless sounds.

7. The method of claim 1, wherein said identifying said word or sentence includes categorizing a word having stress in different syllables when used as a noun or a verb.

8. The method of claim 1, wherein said viewing mouth movement includes ascertaining the placement of the tongue, movement of the jaw, and the orientation or shape of the mouth.

9. The method of claim 1, wherein said pronouncing the word or sentence includes making distinction between clear and dark words.

10. The method of claim 1, wherein said recording mouth movement includes audio and video recordings.

11. The method of claim 1, wherein said sending is done electronically over a network.

12. The method of claim 1, wherein said receiving feedback includes providing instructions on how to pronounce the word or sentence correctly when an evaluation of the recording determines that the word or sentence was not pronounced sufficiently correctly.

13. The method of claim 12, wherein said instruction is provided in writing.

14. The method of claim 12, wherein said instruction includes visual aids for further guidance.

15. The method of claim 12, further comprising:

providing instruction to review said training and said viewing.

16. An instructional system, comprising:

a multimedia player to provide video and audio instructions on how to shape mouth, tongue, and jaw, to correctly pronounce selected words or sentences;

an audio/video recorder to record movements of the mouth, tongue, and jaw, where said recorder provides a recording of said movements; and an instructor to review said recording of said movements, said instructor to provide an evaluation feedback on pronunciation of the selected words or sentences based on said movements.

17. The system of claim 16, further comprising:

a video portion in said multimedia player to provide a video recording of said movements; and an audio portion in said multimedia player to provide an audio recording of said movements.

18. The system of claim 16, wherein said multimedia player resides within a computer, and is operated by an operating system.

19. The system of claim 16, wherein said audio/video recorder interfaces with a computer to digitally record said movements.

\* \* \* \* \*